US007423692B2

(12) United States Patent
Chen

(10) Patent No.: US 7,423,692 B2
(45) Date of Patent: Sep. 9, 2008

(54) DE-INTERLACE METHOD AND METHOD FOR GENERATING DE-INTERLACE ALGORITHM

(75) Inventor: Hao Chang Chen, Shindian (TW)

(73) Assignee: Via Technologies, Inc., Taipei (TW)

( * ) Notice: Subject to any disclaimer, the term of this patent is extended or adjusted under 35 U.S.C. 154(b) by 532 days.

(21) Appl. No.: 10/999,984

(22) Filed: Dec. 1, 2004

(65) Prior Publication Data

US 2006/0050176 A1 Mar. 9, 2006

(30) Foreign Application Priority Data

Sep. 1, 2004 (TW) .............................. 93126434 A

(51) Int. Cl.
*H04N 7/01* (2006.01)
(52) U.S. Cl. ...................... 348/448; 348/452
(58) Field of Classification Search ................. 348/448, 348/452, 700, 701; 382/299–301
See application file for complete search history.

(56) References Cited

U.S. PATENT DOCUMENTS

| | | | | |
|---|---|---|---|---|
| 6,459,455 | B1 * | 10/2002 | Jiang et al. .................. | 348/452 |
| 6,930,729 | B2 * | 8/2005 | Min ........................... | 348/607 |
| 7,196,731 | B2 * | 3/2007 | Tsao et al. .................. | 348/448 |
| 2002/0101535 | A1 * | 8/2002 | Swan ......................... | 348/448 |
| 2005/0078214 | A1 * | 4/2005 | Wong et al. ................ | 348/452 |
| 2005/0134730 | A1 * | 6/2005 | Winger et al. .............. | 348/448 |
| 2005/0162548 | A1 * | 7/2005 | Kang et al. ................ | 348/448 |

* cited by examiner

*Primary Examiner*—Victor R Kostak
(74) *Attorney, Agent, or Firm*—Bacon & Thomas, PLLC

(57) ABSTRACT

A de-interlace method and method for generating a de-interlace algorithm include steps of generating an adaptive tuning de-interlace algorithm. The steps of the method for generating a de-interlace algorithm include generating a characteristic difference value according to a first line-segment data and a second line-segment data, determining a blending vector based on the characteristic difference value, and generating the adaptive tuning de-interlace algorithm according to the blending vector Wherein, the blending vector is to determine a weight of a first de-interlace algorithm in the adaptive tuning de-interlace algorithm, and a difference between the blending vector and a constant is to determine a weight of a second de-interlace algorithm in the adaptive tuning de-interlace algorithm. Moreover, the de-interlace method performs the adaptive tuning de-interlace algorithm to generate a de-interlaced image.

18 Claims, 7 Drawing Sheets

| 23 | 39 | 29 | -- |
|----|----|----|----|
| 25 | 86 | 44 | -- |

FIG. 3C

| 72 | 27 | 6 | 18 |
|----|----|---|----|
| 3  | 24 | 54 | 72 |

FIG. 3D

| Division | Blending vector |
|---|---|
| characteristic difference value>80 | 0 |
| 80> characteristic difference value >70 | 1/8 |
| 70> characteristic difference value >60 | 2/8 |
| 60> characteristic difference value >50 | 3/8 |
| 50> characteristic difference value >40 | 4/8 |
| 40> characteristic difference value >30 | 5/8 |
| 30> characteristic difference value >20 | 6/8 |
| 20> characteristic difference value >10 | 7/8 |
| 10> characteristic difference value | 1 |

| Blending vector | Adaptive tuning de-interlace algorithm | Output of pixel |
|---|---|---|
| 0 | Bob de-interlace algorithm; Bob de-interlace algorithm with interpolation | $YC_{out} = \{\frac{1}{2}YC_0 + \frac{1}{2}YC_1 ; YC_2\}$ |
| 1/8 | $\frac{1}{8}$Weave de-interlace algorithm+$\frac{7}{8}$Bob de-interlace algorithm | $YC_{out} = \frac{1}{8}YC_1 + \frac{7}{8}YC_2$ |
| 2/8 | $\frac{2}{8}$Weave de-interlace algorithm+$\frac{6}{8}$Bob de-interlace algorithm | $YC_{out} = \frac{2}{8}YC_1 + \frac{6}{8}YC_2$ |
| 3/8 | $\frac{3}{8}$Weave de-interlace algorithm+$\frac{5}{8}$Bob de-interlace algorithm | $YC_{out} = \frac{3}{8}YC_1 + \frac{5}{8}YC_2$ |
| 4/8 | $\frac{4}{8}$Weave de-interlace algorithm+$\frac{4}{8}$Bob de-interlace algorithm | $YC_{out} = \frac{4}{8}YC_1 + \frac{4}{8}YC_2$ |
| 5/8 | $\frac{5}{8}$Weave de-interlace algorithm+$\frac{3}{8}$Bob de-interlace algorithm | $YC_{out} = \frac{5}{8}YC_1 + \frac{3}{8}YC_2$ |
| 6/8 | $\frac{6}{8}$Weave de-interlace algorithm+$\frac{2}{8}$Bob de-interlace algorithm | $YC_{out} = \frac{6}{8}YC_1 + \frac{2}{8}YC_2$ |
| 7/8 | $\frac{7}{8}$Weave de-interlace algorithm+$\frac{1}{8}$Bob de-interlace algorithm | $YC_{out} = \frac{7}{8}YC_1 + \frac{1}{8}YC_2$ |
| 1 | Weave de-interlace algorithm | $YC_{out} = YC_1$ |

FIG. 5

DE-INTERLACE METHOD AND METHOD FOR GENERATING DE-INTERLACE ALGORITHM

CROSS REFERENCE TO RELATED APPLICATIONS

This Non-provisional application claims priority under 35 U.S.C. §119(a) on Patent Application No(s). 093126434 filed in Taiwan, Republic of China on Sep. 1, 2004, the entire contents of which are hereby incorporated by reference.

BACKGROUND OF THE INVENTION

1. Field of Invention

The invention relates to an interlace method and a method for generating an interlace algorithm and, in particular, to a method for generating an interlace algorithm, which can generate an adaptive tuning de-interlace algorithm, and an interlace method, which can utilize the adaptive tuning de-interlace algorithm.

2. Related Art

The video industry has been progressed form the analog age to the digital age, so the present video processing device must equip the function for transforming the analog signals into digital signals. Regarding to the scan standard of present analog televisions, the most popular standards includes the Television Standards Committee (NTSC) type and Phase Alternation by Line (PAL) type. In the NTSC type, 525 scan lines are used to construct a frame (or a screen), and 30 frames (screens) are displayed per second. Herein, every screen is displayed by a way of interlace scan. In other words, after the first scan line is displayed, the consequential scan line to be displayed is not the second scan line but the third scan line, and then the fifth scan line, seventh scan line, and so on are displayed in sequence until the $525^{th}$ scan line. After the $525^{th}$ scan line, the second scan line is consequentially displayed, and then the forth scan line, sixth scan line, eighth scan line and so on are displayed in sequence. Thus, the obtained smooth and clear frames (screens) are actually interlaced by the frame of odd scan lines, the frame of even scan lines, the frame of odd scan lines, and so on. This is the "interlace scan", and is known as an "interlacing format".

The interlace video signals are composed of two fields, wherein each field includes the odd scan lines of the image or the even scan lines of the image. When performing the image capture, the television camera outputs the odd scan lines of the image in a flash, and then outputs the even scan lines of the image after 16.7 ms later. During the period between the odd scan lines of the image and the even scan lines of the image are displayed, a temporal shift occurs and should be positioned in a frame based system. However, this method, regarding to the dynamic image with moving properties, may cause serrations at the edge of the image. In addition, the odd field and even field are respectively constructed by half scan lines such as 263 scan lines and 262 scan lines, so that the resolution of each odd field or even field is only half of the original image, and each of the odd fields and even fields is displayed per $\frac{1}{60}$ second. Thus, the human vision may not figure out the motion artifacts. However, once the screen is enlarged, the scan lines seem thicker resulting in the blurred screen(s).

The disadvantages of performing "interlace scan" or "interlacing format" are now solved by the progressive scan technology. The progressive scan technology is to continuously display the first scan line, second scan line, third scan line, and so on until the $525^{th}$ scan line. Sixty screens are represented per second. Thus, the scan speed of the progressive scan is twice of that of the interlace scan. Accordingly, the screen displayed on the monitor is constructed with 525 scan lines, so that the screen is very fine and clear, which is the most advantage of the progressive scan. As a result, the present advanced video apparatus adopts this method for scan and display.

However, the image signals of the current NTSC system, until now, usually adopt the interlace scan method. If the screen built according to the interlace scan method is displayed with a progressive scan display system, for example that a DVD video image edited according to the interlace scan method is played and displayed on a high definition TV (HDTV) directly, the displayed screen only includes the odd field or the even field resulting in the poor image resolution (since only half scan lines are displayed). To solve this problem, the de-interlace technology is developed to provide a method for transforming the interlace scan into the progressive scan. For example, when the screen of the standard definition TV (SDTV) is transformed to that of the HDTV, a de-interlace step and a sampling step are employed to increase the original 480 interlace scan lines up to 720 progressive scan lines and to modify the misalignment while merging the interlace scan fields including the odd scan lines and the even scan lines. Accordingly, the vision-satisfied progressive image can be generated.

As mentioned above, although the de-interlace technology can solve the problem of poor resolution when the interlace scan system image displayed in the progressive scan system, a considerable situation is that the displayed image is always moving. If ignoring this and then directly merging the odd field and even field, the static image portion may get clear picture, but the dynamic image portion may be blurred and motion artifacts. As a result, the high quality screen may not be displayed. In view of the above, the de-interlace technology adopts two basic algorithms including the non-motion compensated algorithm and the motion-compensated algorithm. The non-motion compensated algorithm includes two typical linear transform technologies, which are wave and bob de-interlace algorithms. The wave de-interlace algorithm is to overlaid or wave two input fields for generating a progressive frame. Considering the static screens, the wave de-interlace algorithm can perfectly align images of different fields to obtain a clear de-interlace image without decayed. However, considering the dynamic screens, the wave de-interlace algorithm may cause obvious serrations at the edge of the dynamic image. This is because of that the dynamic screen has the temporal shift. Therefore, when waving an odd field and an even field into a frame, the image misalignment may occur caused by the temporal shift between the odd and even fields so as to generate a blurred frame with serrations (as shown in FIG. 1). In addition, the bob de-interlace algorithm is to retrieve one field, such as the even filed, and the other field, such as the odd field, is discarded. Thus, the resolution of the vertical direction of the screen is decreased from 720×486 pixels to 720×243 pixels. This image with only half resolution employs the scan lines to fill up the adjacent voids, so as to obtain an image with 720×486 pixels. The advantages of the bob de-interlace algorithm are to overcome the motion artifacts of the screen, and have smaller calculation requirement. And the disadvantage thereof is the poor vertical resolution (half of the original image), so that the fine resolution of the progressive screen is decreased.

Since the present digital versatile disk (DVD) still records the images shot with the interlace scan system, the displayed image from the DVD must be processed with an interlace procedure. When using a Hi-Fi digital TV to play the DVD, the playing device must provide an option of the wave or bob de-interlace method for transforming the interlace scan into the progressive scan. However, if the wave de-interlace method is selected, the misalignment for the moving image may occur to cause the displayed image with serrations. Otherwise, if the bob de-interlace method is selected, the misalignment for the moving image may be overcome to obtain clear and motion nature of dynamic image, but the vertical resolution for the static image is sacrificed. Therefore, between the present video playing system and digital displaying system, the image qualities of dynamic screens and static screens can be concerned properly after the de-interlace processes.

SUMMARY OF THE INVENTION

In view of the above, this invention is to provide a method for generating an adaptive tuning de-interlace algorithm, which includes the following steps of: generating a characteristic difference value according to a first line-segment data and a second line-segment data; determining a blending vector based on the characteristic difference value; and generating an adaptive tuning de-interlace algorithm according to the blending vector. In the invention, the blending vector is to determine a weight of a first de-interlace algorithm in the adaptive tuning de-interlace algorithm, and a difference between the blending vector and a constant is to determine a weight of a second de-interlace algorithm in the adaptive tuning de-interlace algorithm. In this case, the first de-interlace algorithm is the weave de-interlace algorithm, and the second de-interlace algorithm is the bob de-interlace algorithm.

In addition, the invention also discloses a de-interlace method including the following steps of: generating a characteristic difference value according to a first line-segment data and a second line-segment data; determining a blending vector based on the characteristic difference value; generating an adaptive tuning de-interlace algorithm according to the blending vector, wherein the blending vector is to determine a weight of a first de-interlace algorithm in the adaptive tuning de-interlace algorithm, and a difference between the blending vector and a constant is to determine a weight of a second de-interlace algorithm in the adaptive tuning de-interlace algorithm; and performing the adaptive tuning de-interlace algorithm to generate a de-interlaced image. Herein, the first de-interlace algorithm is the weave de-interlace algorithm, and the second de-interlace algorithm is the bob de-interlace algorithm.

As mentioned above, since the invention can generate an adaptive tuning de-interlace algorithm, the problem in the prior art that only the conventional weave or bob de-interlace algorithm can be chosen to perform the de-interlace process between the present video playing system (such as the DVD player) and digital displaying system (such as the HDTV or plasma TV) can be solved. Thus, the image qualities of dynamic screens and static screens can be both concerned properly after the de-interlace processes, so as to enhance the qualities of output images.

BRIEF DESCRIPTION OF THE DRAWINGS

The invention will become more fully understood from the detailed description given hereinbelow illustration only, and thus is not limitative of the present invention, and wherein:

FIG. 3C is a schematic view showing characteristic difference values between two line segments, which are adjacent two line segments of one frame;

FIG. 3D is a schematic view showing characteristic difference values between two line segments, which are located at the same position of different frames;

FIG. 5 is a schematic view showing adaptive tuning de-interlace algorithms and output values of the pixels calculated according to the embodiment.

DETAILED DESCRIPTION OF THE INVENTION

The present invention will be apparent from the following detailed description, which proceeds with reference to the accompanying drawings, wherein the same references relate to the same elements.

Figure 1:
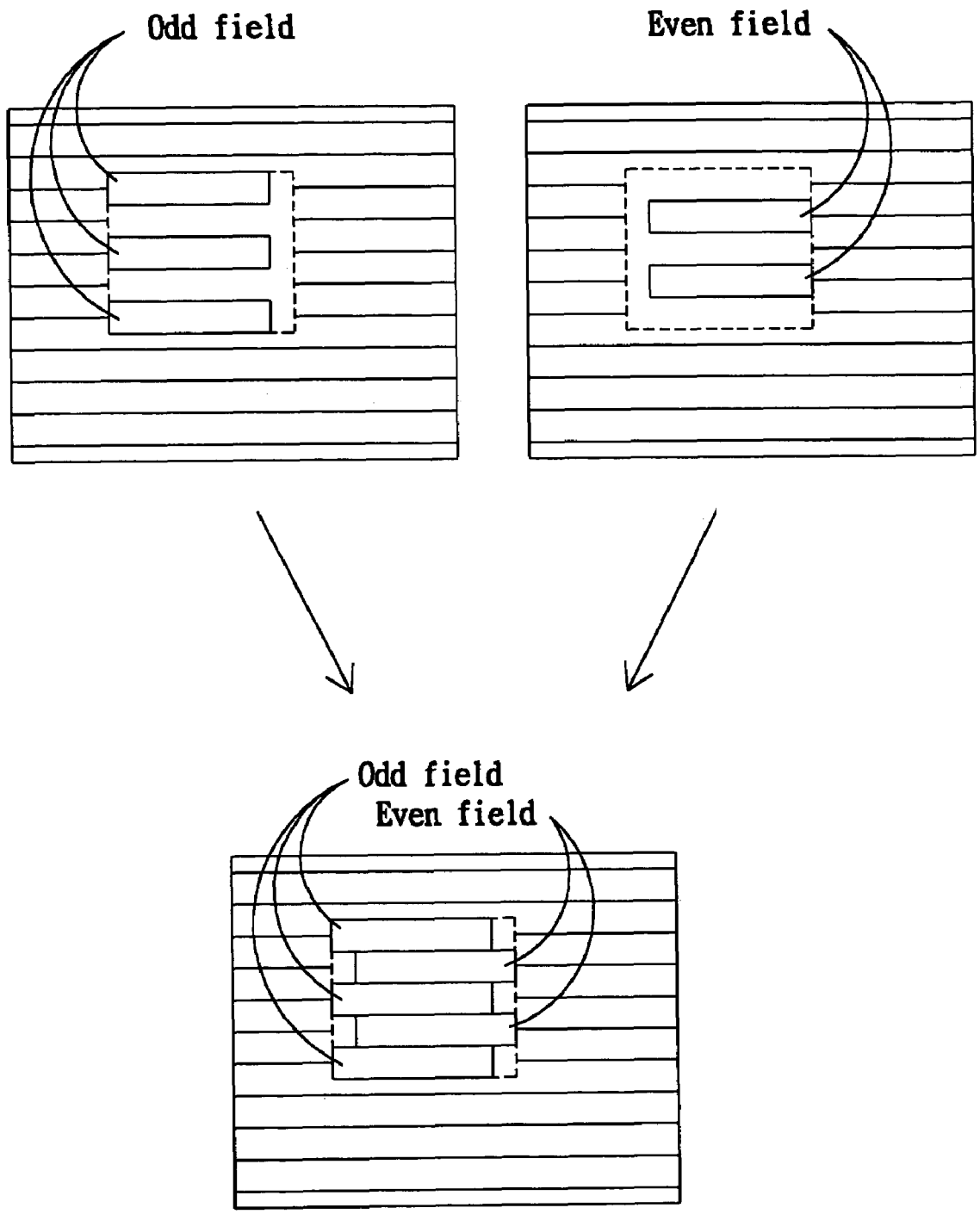
FIG. 1 is a schematic view showing a progressive frame with serrations generated according to the conventional weave de-interlace algorithm.
Figure 2:
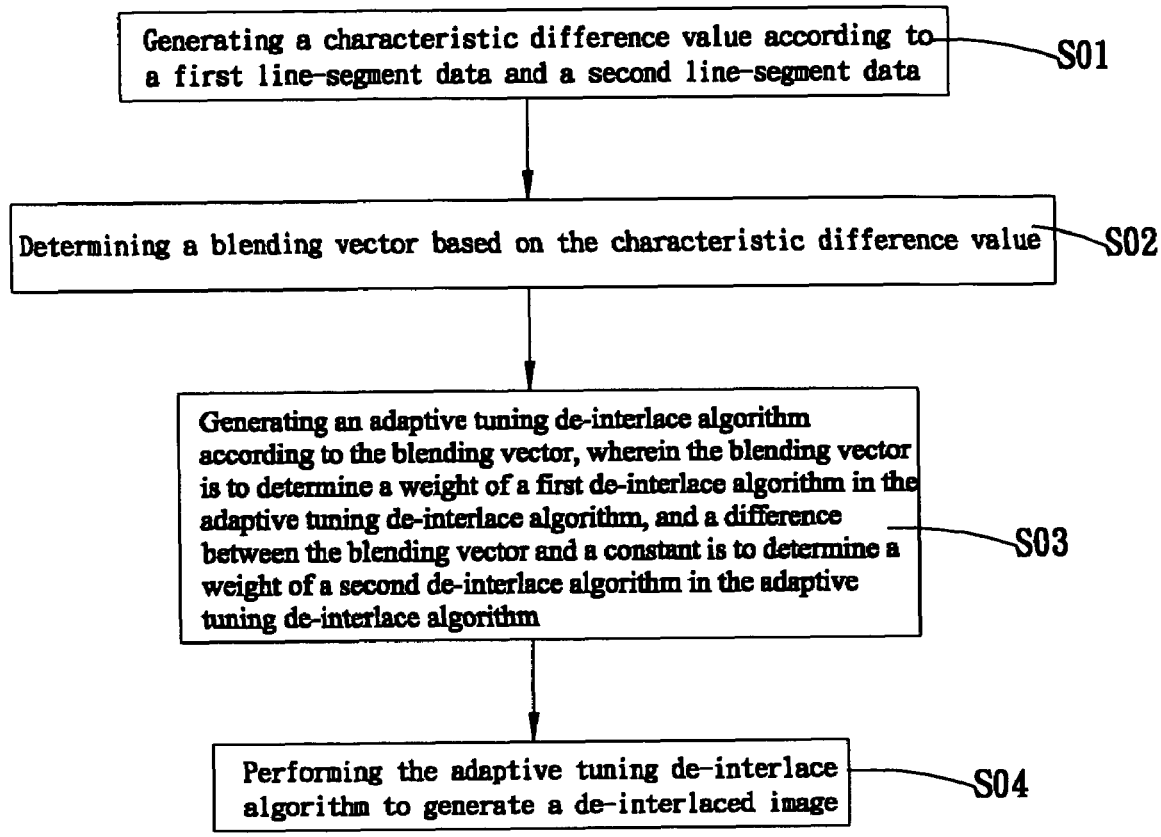
FIG. 2 is a flow chart showing a de-interlace method according to a preferred embodiment of the invention.
Figure 3A:
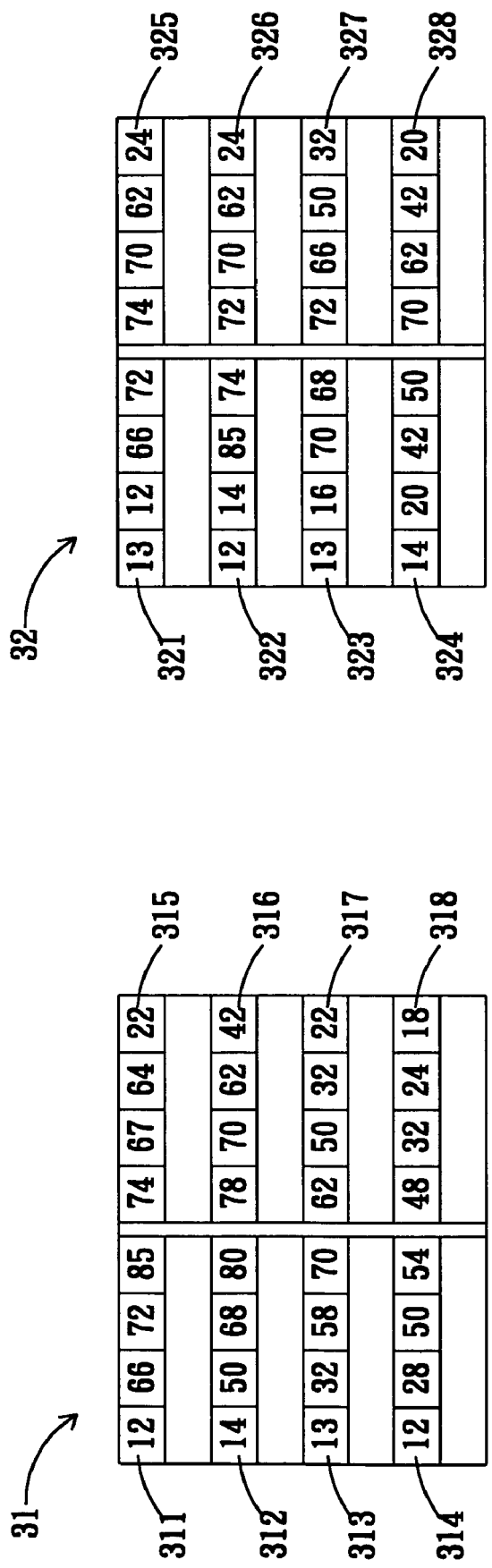
FIG. 3A is a schematic view showing a frame with a plurality of line segments and the luminance of pixels of each line segment.

With reference to FIG. 2, a de-interlace method according to an embodiment of the invention includes the following steps S01 to S04. Firstly, the step S01 is to generate a characteristic difference value according to a first line-segment data and a second line-segment data. The first line-segment data includes the characteristic value of a first line segment, and the second line-segment data includes the characteristic value of a second line segment. The characteristic difference value is the difference between the characteristic values of the first and second line segments. In the present embodiment, the first line segment and the second line segment could be adjacent two line segments of one frame (intra-frame) or located at the same position of different frames (inter-frame). The characteristic value of each line segment can be calculated based on the luminance (Y) and/or chrominance (Cr and Cb) of the pixels constructing the line segment. For example, as shown in FIG. 3A, the frame 31 may display the odd field or even field of a screen, which includes several line segments 311 to 318 composed of several pixels. The values of the luminance (Y) of the pixels are shown as the figures in each line segment. Herein, the characteristic values of the line segments 311 to 318 are the sums of the luminance (Y). In more details, the characteristic value of the line segment 311 is the sum of the luminance (Y) of the pixels of the line segment 311, and is as the following:

(The characteristic value of the line segment 311)=12+66+72+85=235

Figure 3B:
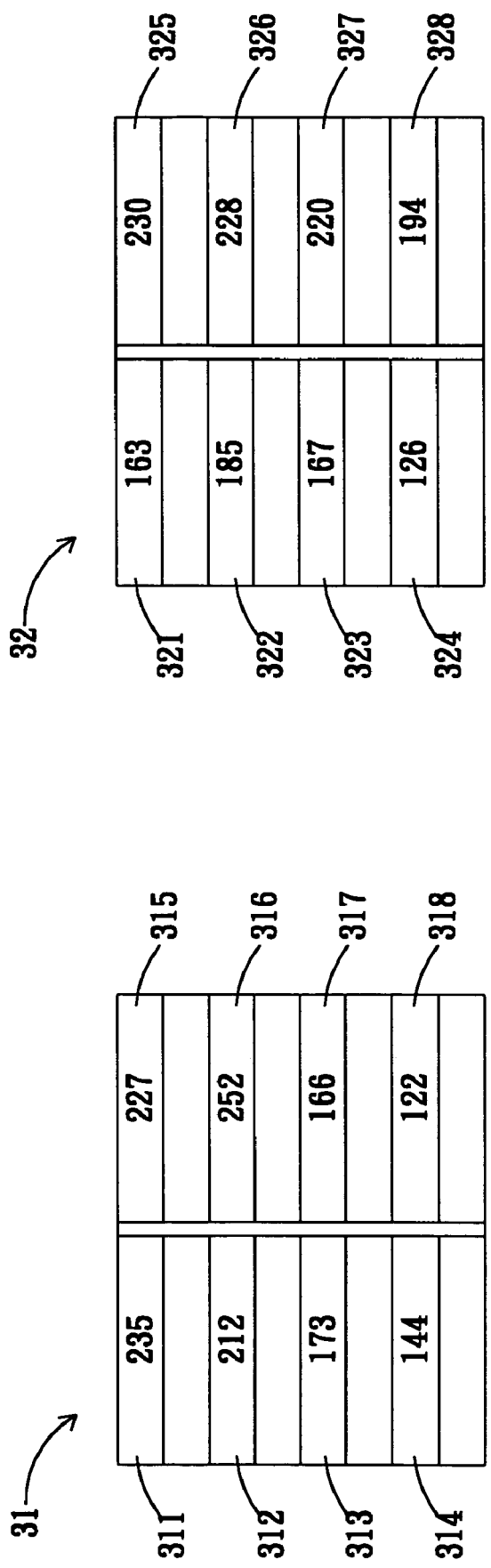
FIG. 3B is a schematic view showing a characteristic value of each line segment shown in the FIG. 3A.

In addition, another frame 32 may also display the odd field or even field of a screen as shown in FIG. 3A, which includes several line segments 311 to 318 composed of several pixels. The values of the luminance (Y) of the pixels are shown as the figures in each line segment. Herein, the characteristic values of the line segments 311 to 318 are respectively the sums of the values of the luminance (Y). Accordingly, each line segment of the frame 31 and frame 32 has a characteristic value as shown in FIG. 3B. In the above-mentioned step S01, if the first and second line segments are adjacent two line segments in the same frame, e.g. the line segments 311 and 312 in the frame 31, the generated characteristic difference value is (235−212=) 23 (as shown in FIG. 3C). Other characteristic difference values between other two line segments can be obtained according to the same method as shown in FIG. 3C. Alternatively, if the first and second line segments are located at the same position of different frames, e.g. the line segment 311 in the frame 31 and the line segment 321 in the frame 32, the generated characteristic difference value is (235−163=) 72 (as shown in FIG. 3D). In this case, other characteristic difference values between other two line segments can be obtained according to this method as shown in FIG. 3D.

Figures 4A, 4B:
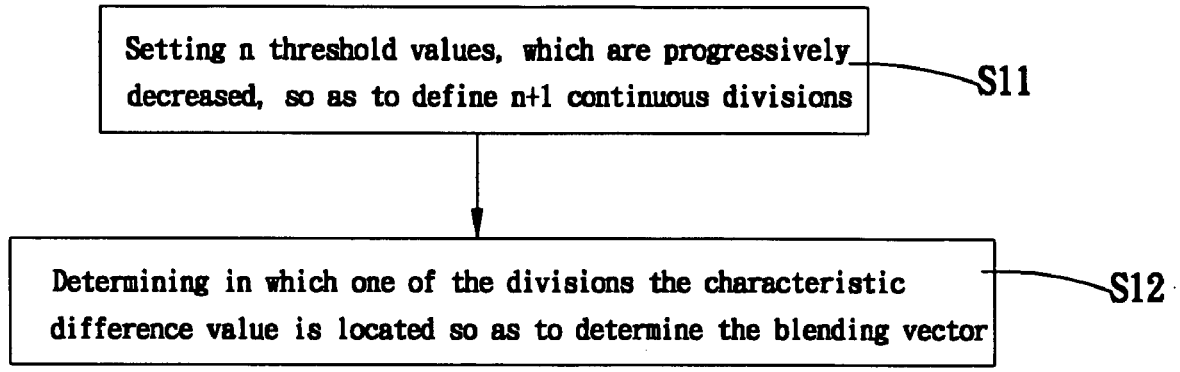
FIG. 4A is a flow chart showing the procedures of a step of determining a blending vector based on the characteristic difference value.
FIG. 4B is a schematic view showing the relationships between the characteristic difference values and the blending vectors.

Secondly, the step S02 is to determine a blending vector based on the characteristic difference value. In this step S02, the blending vector is between 0 and a constant, wherein the embodiment assumes that the constant is 1, so that the blending vector of the embodiment is between 0 and 1. For instance, the blending vector is determined based on the characteristic difference value according to the following rules. If the characteristic difference value is larger, the blending vector approaches 0; otherwise, if the characteristic difference value is smaller, the blending vector approaches 1 (the constant). To make this embodiment more comprehensive, the detail procedures of the step S02 for determining the blending vector based on the characteristic difference value will be described herein below with reference to FIGS. 4A and 4B. As shown in FIG. 4A, the step S02 includes the steps of: setting n threshold values, which are progressively decreased, so as to define n+1 continuous divisions (step S1); and determining in which one of the divisions the characteristic difference value is located so as to determine the blending vector (step S12). According to the step S11, different compensation character curves can be determined. Referring to FIG. 4B, there are eight threshold values, which are 80, 70, 60, 50, 40, 30, 20, and 10 in sequence. Thus, the nine continuous divisions defined by the threshold values include a division larger than 80, a division between 80 and 70, a division between 70 and 60, a division between 60 and 50, a division between 50 and 40, a division between 40 and 30, a division between 30 and 20, a division between 20 and 10, and a division less than 10. In this case, when the characteristic difference value is located in an $x^{th}$ division of the above divisions, the blending vector is determined according to the following equation:

$$(\text{The blending vector}) = \frac{x-1}{n}$$

wherein, n is the total number of set threshold values. As shown in FIG. 4B, the nine blending vectors corresponding to the previously mentioned divisions are respectively 0, 1/8, 2/8, 3/8, 4/8, 5/8, 6/8, 7/8, and 1.

Then, the step S03 is to generate an adaptive tuning de-interlace algorithm according to the blending vector. In this case, the blending vector is to determine a weight of a first de-interlace algorithm in the adaptive tuning de-interlace algorithm, and a difference between the blending vector and a constant is to determine a weight of a second de-interlace algorithm in the adaptive tuning de-interlace algorithm. In the present embodiment, assuming the constant is 1, the adaptive tuning de-interlace algorithm is determined according to the following equation:

(The adaptive tuning de-interlace algorithm)=(The blending vector)×(The first de-interlace algorithm)+(1−(The blending vector))×(The second de-interlace algorithm)

Wherein, the first de-interlace algorithm is a weave de-interlace algorithm, and the second de-interlace algorithm is a bob de-interlace algorithm. Accordingly, the adaptive tuning de-interlace algorithm can be obtained as shown in FIG. 5. To be noted, when the blending vector is 0, the second de-interlace algorithm may also be a Bob de-interlace algorithm with interpolation. Besides, the above-mentioned adaptive tuning de-interlace algorithm can be represented with the output (including the luminance and/or chrominance) of each pixel, which is determined according to the following equation (as shown in FIG. 5):

$$YC_{out} = \alpha \times YC_1 + (1-\alpha) \times YC_2$$

wherein, $YC_{out}$ is the output of the pixel of the embodiment, $YC_1$ is the output of the pixel according to the first de-interlace algorithm, $YC_2$ is the output of the pixel according to the second de-interlace algorithm, and $\alpha$ is the blending vector.

The invention also discloses a method for generating a de-interlace algorithm comprising the steps S01 to S04, wherein part of the method for generating a de-interlace algorithm is the same as the previously mentioned steps S01 to S03, and the detailed descriptions are omitted for concise purpose.

Finally, the step S04 is to perform the adaptive tuning de-interlace algorithm to generate a de-interlaced image.

In summary, the invention can generate an adaptive tuning de-interlace algorithm (referring to steps S01 to S03), so that the problem in the prior art that only the conventional weave or bob de-interlace algorithm can be chosen to perform the de-interlace process between the present video playing system (such as the DVD player) and digital displaying system (such as the HDTV or plasma TV) can be solved. Therefore, the image qualities of dynamic screens and static screens can be both concerned properly after the de-interlace processes, so as to enhance the qualities of output images.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A de-interlace method, comprising:
    generating a characteristic value of a first line-segment, wherein the characteristic value of the first line segment is the sum of the luminance of a plurality of pixels of the first line segment;
    generating a characteristic value of a second line-segment, wherein the characteristic value of the second line segment is the sum of the luminance of a plurality of pixels of the second line segment;
    generating a characteristic difference value according the difference between the characteristic value of the first and second line segments;
    determining a blending vector based on the characteristic difference value;
    generating an adaptive tuning de-interlace algorithm according to the blending vector, wherein the blending vector is to determine a weight of a first de-interlace algorithm in the adaptive tuning de-interlace algorithm, and a difference between the blending vector and a constant is to determine a weight of a second de-interlace algorithm in the adaptive tuning de-interlace algorithm; and performing the adaptive tuning de-interlace algorithm to generate a de-interlaced image.

2. The method of claim 1, wherein the first line segment and the second line segment are adjacent two line segments of one frame (intra-frame).

3. The method of claim 1, wherein the first line segment and the second line segment are located at the same position of difference frame (inter-frame).

4. The method of claim 1, wherein the blending vector is between 0 and 1, the constant is 1, and the adaptive tuning de-interlace algorithm is determined according to the following:

(the adaptive tuning de-interlace algorithm)=(the blending vector)×(the first de-interlace algorithm)+(1-(the blending vector))×(the second de-interlace algorithm).

5. The method of claim 1, wherein the first de-interlace algorithm is a weave de-interlace algorithm, and the second de-interlace algorithm is a bob de-interlace algorithm.

6. The method of claim 1, wherein if the characteristic difference value is large, the blending vector approaches 0, and if the characteristic difference value is smaller, the blending vector approaches 1.

7. The method of claim 1, wherein the blending vector is 0, the second de-interlace algorithm is a Bob de-interlace algorithm with interpolation.

8. The method of claim 1, wherein the step of determining the blending vector based on the characteristic difference value comprises:
setting n threshold values, which are progressively decreased, so as to define n+1 continuous divisions; and
determining in which one of the divisions the characteristic difference value is located so as to determine the blending vector.

9. The method of claim 8, wherein the characteristic difference value is located in an $x^{th}$ division of divisions, the blending vector is determined according to the following;

$$(\text{the blending vector}) = \frac{x-1}{n}.$$

10. A method for generating a de-interlace algorithm, comprising:
generating a characteristic value of a first line-segment, wherein the characteristic value of the first line segment is the sum of the luminance of a plurality of pixels of the first line segment;
generating a characteristic value of a second line-segment, wherein the characteristic value of the second line segment is the sum of the luminance of plurality of pixels of the second line segment;
generating a characteristic difference value according the difference between the characteristic value of the first and second line segments;
determining a blending vector based on the characteristic difference value; and
generating an adaptive tuning de-interlace algorithm according to the blending vector, wherein the blending vector is to determine a weight of a first de-interlace algorithm in the adaptive tuning de-interlace algorithm, and a difference between the blending vector and a constant is to determine a weight of a second de-interlace algorithm in the adaptive tuning de-interlace algorithm.

11. The method of claim 10, wherein the first line segment and the second line segment are adjacent two line segments of one frame (intra-frame).

12. The method of claim 10 wherein the first line segment and the second line segment are located at the same position of difference frame (inter-frame).

13. The method of claim 10, wherein the blending vector is between 0 and 1, the constant is 1, and the adaptive tuning de-interlace algorithm is determined according to the following:

(the adaptive tuning de-interlace algorithm)=(the blending vector)×(the first de-interlace algorithm)+(1-(the blending vector))×(the second de-interlace algorithm).

14. The method of claim 10, wherein the first de-interlace algorithm is a weave de-interlace algorithm, and the second de-interlace algorithm is a bob de-interlace algorithm.

15. The method of claim 10, wherein if the characteristic difference value is large, the blending vector approaches 0, and if the characteristic difference value is smaller, the blending vector approaches 1.

16. The method of claim 10 wherein the blending vector is 0, the second de-interlace algorithm is a bob de-interlace algorithm with interpolation.

17. The method of claim 10, wherein the step of determining the blending vector based on the characteristic difference value comprises:
setting n threshold values, which are progressively decreased, so as to define n+1 continuous divisions; and
determining in which one of the divisions the characteristic difference value is located so as to determine the blending vector.

18. The method of claim 17, wherein the characteristic difference value is is located in an $x^{th}$ division of divisions, the blending vector is determined according to the following;

$$(\text{the blending vector}) = \frac{x-1}{n}.$$

* * * * *